United States Patent [19]

Kim

[11] Patent Number: 5,127,366
[45] Date of Patent: Jul. 7, 1992

[54] AQUARIUM HAVING AQUACULTURE POT AND FOUNTAIN

[76] Inventor: Chang S. Kim, 1658-7 Shinlim 8-dong, Gwanak-ku, Rep. of Korea

[21] Appl. No.: 726,747

[22] Filed: Jul. 8, 1991

[30] Foreign Application Priority Data

Sep. 19, 1990 [KR] Rep. of Korea ............ 14579

[51] Int. Cl.$^5$ ............................................. A01K 63/00
[52] U.S. Cl. ............................................. 119/5; 47/79
[58] Field of Search ............ 119/5, 3; 47/69, 79, 47/82

[56] References Cited

U.S. PATENT DOCUMENTS

| | | | |
|---|---|---|---|
| 692,832 | 2/1902 | Creasey | 119/5 |
| 2,306,027 | 12/1942 | Swaney | 119/5 |
| 4,754,571 | 7/1988 | Riechmann | 119/5 |
| 4,996,792 | 3/1991 | Holtkamp, Sr. | 47/79 |

FOREIGN PATENT DOCUMENTS

| | | | |
|---|---|---|---|
| 3020160 | 12/1981 | Fed. Rep. of Germany | 119/5 |
| 9015161 | 9/1990 | Rep. of Korea . | |
| 8100385 | 8/1982 | Netherlands | 47/69 |

Primary Examiner—Robert P. Swiatek
Assistant Examiner—Todd E. Manahan
Attorney, Agent, or Firm—Warner, Norcross & Judd

[57] ABSTRACT

An aquarium having an aquaculture pot and a water fountain is disclosed in which water is recirculated through filtering material in the pot. A tank cover is formed with a central opening in which the pot is supported. A pipe rises from the water through an opening in the bottom of the pot. The fountain is connected to the upper end of the pipe such that water pumped from the tanks through the pipe sprays from the fountain into the filtering material in the pot. The water is purified by the filter material and returns to the tank through drain openings in the pot bottom.

8 Claims, 2 Drawing Sheets

FIG. 3
FIG. 4
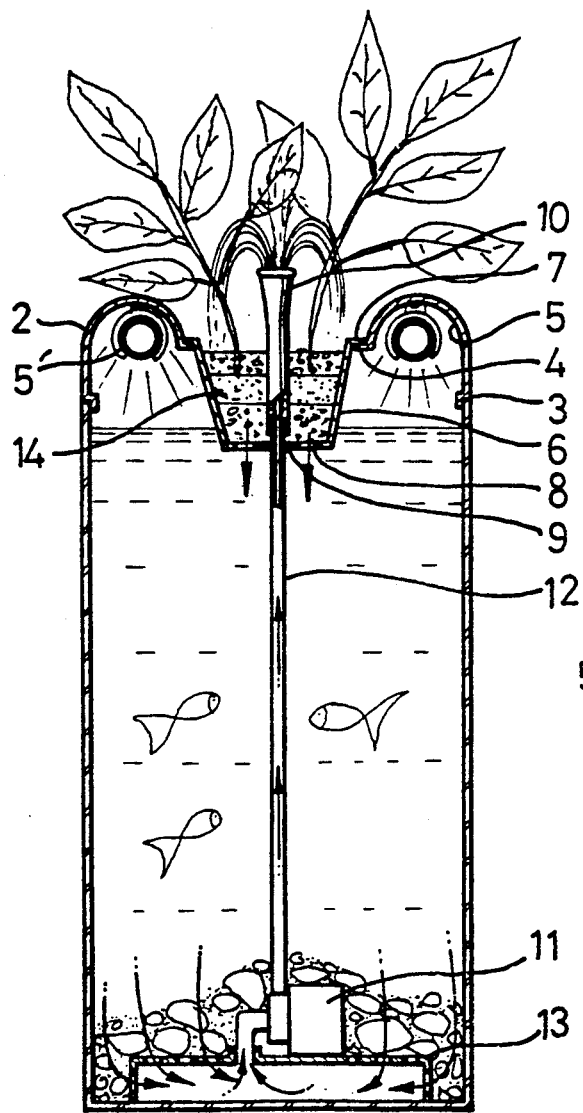
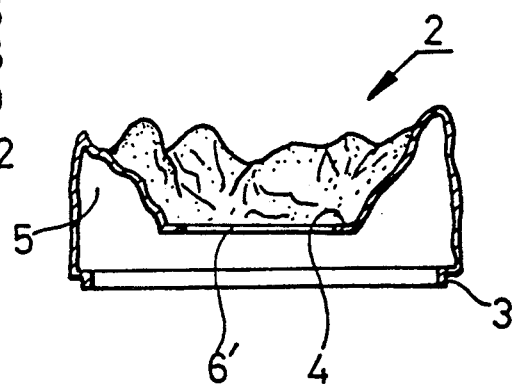

AQUARIUM HAVING AQUACULTURE POT AND FOUNTAIN

BACKGROUND OF THE INVENTION

1. Field of the Invention

The present invention relates to an aquarium and, more particularly, to an aquarium having a fountain and an aquaculture pot with filtering material mounted to the top. Water pumped from the aquarium tank spouts from the fountain and passes through the filtering material in the pot down into the aquarium tank, thereby recirculating and clarifying the water.

2. Description of the Related Art

Indoor aquaculture systems and aquariums are known for providing a serene and pleasing interior decor.

A conventional aquarium is inconvenient in several ways. The interior of the tank must be frequently cleaned of accumulated precipitates such as fish excrement and leftover food. The water must be renewed. Also, sudden changes in temperature and environment occurring in the course of cleaning and renewing the water of results in death of fish in the tank. Furthermore, a separate oxygen supply system, such as an air bubble generator, is required to make up for deficient oxygen in the water.

A combined and integrated aquaculture system and aquarium is shown in Korean Utility Model Laying Open No. 90-15161, laid open Sep. 1, 1990. However, the invention described therein is subject to the same disadvantages described above.

SUMMARY OF THE INVENTION

The present invention overcomes the disadvantages described above by providing an aquarium with a top cover member having a pot containing a filtering material through which the water is recirculated. Drain holes are provided at the bottom of the pot. A fountain is provided in the pot connected to a pipe passing through the aquarium from the bottom of the aquarium. A motorized pump connected to the pipe draws water and precipitates, including fish excrement and leftover food, from the bottom of the aquarium. The water rises through the pipe and spouts out of the fountain. Water exiting the fountain collects in the pot and passes through the filtering material and the drain holes for return into the aquarium tank. Impurities are automatically removed by filtration to clarify the water in the tank, and the water is aerated as it sprinkles from the fountain.

The present invention thus eliminates the inconveniences of cleaning the tank and renewing the tank water. A separate oxygen supply system is no longer needed. In addition, the filtered precipitates in the filtering material aid the growth of plants in the pot.

These and other objects, advantages, and features of the present invention will be more fully understood and appreciated by reference to the written specification and appended drawings.

BRIEF DESCRIPTION OF THE DRAWINGS

FIG. 3 is a vertical, sectional view of the aquarium of FIG. 2; and

FIG. 4 is a vertical sectional view of an alternate embodiment of the tank cover.

DESCRIPTION OF THE PREFERRED EMBODIMENT

Figure 1:
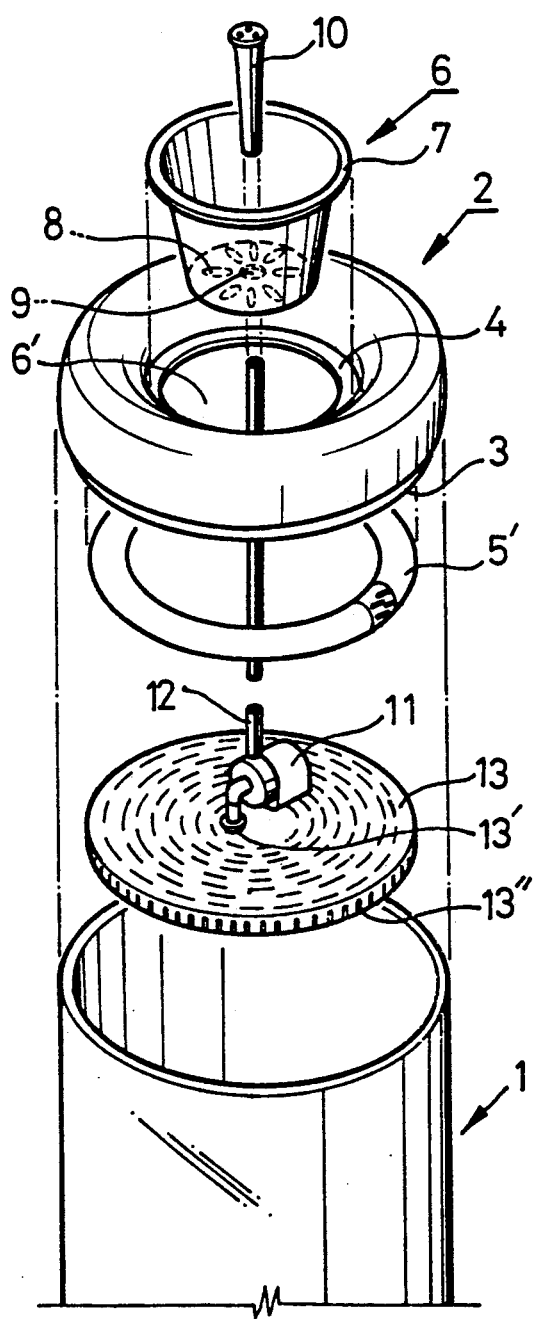
FIG. 1 is a fragmentary, exploded perspective view of an aquarium having an aquaculture pot and fountain according to the principles of the invention.
Figure 2:
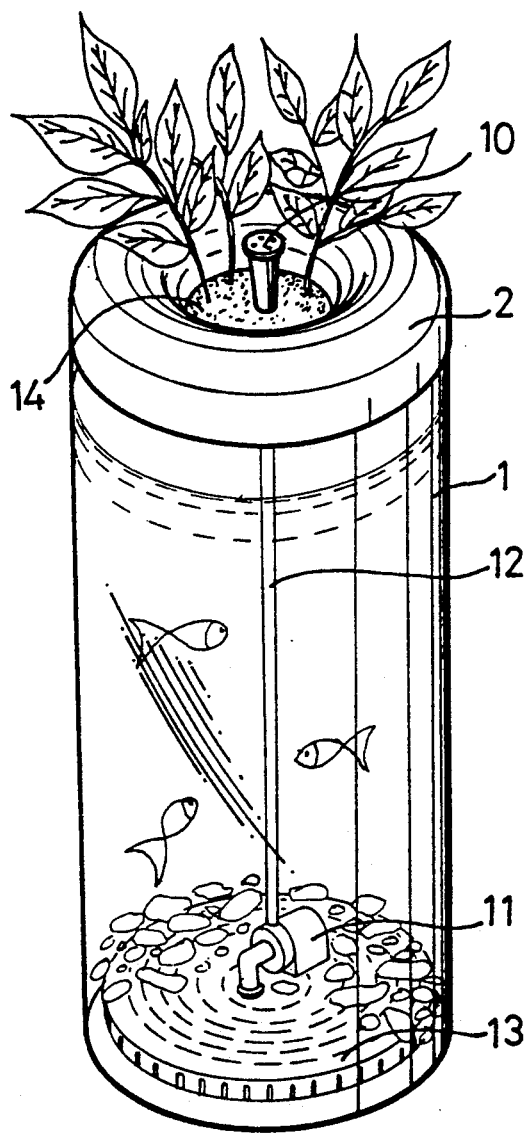
FIG. 2 is a perspective view of the assembled aquarium.

By way of disclosing a preferred embodiment of the invention, and not by way of limitation, there is shown in FIGS. 1-3 an aquarium which includes in its general organization an aquarium tank 1, a tank cover 2, a pot 6, a fountain 10, a pipe 12, and a collector 13.

The tank cover 2 is annular and upwardly rounded so as to form a downwardly opening peripheral recess or channel 5. A lamp 5' is housed within the channel 5. The tank cover 2 is formed with a central opening 6' in which the pot 6 is received. A rim 4 is formed around the opening 6' for supporting the pot. A rim 3 is formed around the lower edge of the tank cover for fitting the tank cover to the upper edge of the tank 1.

The pot 6 has an opening 9 formed in its bottom for receiving the fountain 10. The pot bottom also has a plurality of drain holes 8 formed therethrough for allowing water to pass. The upper edge of the pot is formed with a rim 7 which rests upon the rim 4 of the tank cover to support the pot within the tank cover opening 6'.

A motorized pump 11 is connected to the lower end of pipe 12. The pipe runs from the collector 13 to the fountain 10. Preferably, the pipe 12 is made of transparent material, such as glass, for a good appearance.

The collector 13 is formed with a center hole 13' to receive the lower end of the pipe 12. The collector further has a plurality of suction holes 13" formed around its edge to collect precipitates from the water in the aquarium tank 1.

To assemble the aquarium according to the invention, the collector 13 is placed at the inner bottom of the aquarium tank 1. An end of the pipe 12, to which the motorized pump 11 is connected, is inserted through the hole 13' of the collector 13. The tank cover 2, with the lamp 5' installed within the channel 5, is placed on top of the tank 1 and aligned therewith by the inwardly stepped rim 3. The pot 6 is placed in the opening 6' of the tank cover. The fountain 10 is inserted through the opening 9 of the pot 6 and connected with the other end of the pipe 12. The pot 6 is then filled with a filtering material 14.

The aquarium tank 1 is filled with water and fish are added. Plants for aquaculture are placed in the pot 6 with the filtering material as shown in FIG. 2.

In the preferred embodiment, the filtering material 14 comprises sand, charcoal, sponge, and/or synthetic fiber sponge. The collector 13 may be covered with gravel and/or sand to provide a natural appearance.

Referring to FIG. 3, the pump 11 in operation draws water together with precipitates such as fish excrement and leftover food through the collector 13. The water and precipitates are raised through the pipe 12 and spray out of the fountain 10 to be collected in the pot 6.

In the course of spraying, the water makes contact with air such that oxygen is absorbed into the water. Some water is vaporized into the room air. Dust and other impurities suspended in the air are absorbed into the water. Thus, the invention has the advantages of moisturizing and purifying the room air.

Water collected in the pot 6 passes through the filtering material 14 which separates impurities from the water. The water flows through the drain holes 8 of the pot 6 and returns to the aquarium tank 1.

The impurities accumulated in the filtering material 14 helps the growth of the plants in the pot 6. Oxygen is automatically supplied to the water in the tank 1 by the absorption of oxygen from the air and the return of the water to the tank. The plants in the pot 6 give off oxygen to the air in the room.

The lamp 5' fixed in the tank cover 2 illuminates the interior of the aquarium for decorational effect. The brightness of the lamp may be adjusted for desired effect.

As shown in FIG. 4, the form and appearance of the tank cover 2 may be modified as desired for aesthetic effect. The collector 13 may also be modified as desired.

Thus, the invention advantageously combines an aquarium, an aquaculture pot, and a fountain into an integrated water circulation system which practically eliminates the need for frequent cleaning of the tank interior and renewing the water. The need for a separate oxygen supply unit is eliminated. The invention provides clean air with added moisture. The ambience of the room is improved by the illumination provided by the invention. Furthermore, the growth of the plants in the pot is aided.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

I claim:

1. An aquarium comprising:
   an aquarium tank;
   a tank cover formed with a downwardly opening peripheral channel for housing a lamp and a central opening, said tank cover resting detachably on top of said aquarium tank;
   a pot having a bottom opening and a plurality of bottom drain holes, said pot supported in said opening of said tank cover;
   a fountain received in said opening of said pot;
   a collector having a central hole and a plurality of suction holes, said collector disposed at the inner bottom of said aquarium tank; and
   a pipe inserted through said central hole of said collector and connected to said fountain.

2. The aquarium of claim 1 further comprising a lamp disposed in said channel.

3. The aquarium of claim 1 further comprising filtering material and plants disposed in said pot.

4. The aquarium of claim 3 wherein said filtering material comprises sand.

5. The aquarium of claim 3 wherein said filtering material comprises charcoal.

6. The aquarium of claim 3 wherein said filtering material comprises sponge.

7. The aquarium of claim 3 wherein said filtering material comprises synthetic fiber sponge.

8. The aquarium of claim 1 further comprising a motorized pump connected to said pipe for circulating water.

* * * * *